United States Patent
Oh et al.

(10) Patent No.: US 7,190,969 B1
(45) Date of Patent: Mar. 13, 2007

(54) METHOD AND SYSTEM FOR CONTROLLING SERVICE TO MULTIPLE MOBILE STATIONS HAVING A COMMON SUBSCRIBER IDENTIFIER

(75) Inventors: Dae-Sik Oh, Overland Park, KS (US); Leo Anderson, Raymoore, MO (US); Robert Pippert, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 10/403,767

(22) Filed: Mar. 31, 2003

Related U.S. Application Data

(63) Continuation-in-part of application No. 09/836,521, filed on Apr. 17, 2001.

(51) Int. Cl.
*H04M 1/00* (2006.01)
*H04Q 7/20* (2006.01)

(52) U.S. Cl. .................. 455/551; 455/550.1; 455/463; 455/461

(58) Field of Classification Search ............. 455/550.1, 455/445, 517, 551
See application file for complete search history.

(56) References Cited

U.S. PATENT DOCUMENTS

| | | | | |
|---|---|---|---|---|
| 5,357,558 A | * | 10/1994 | Yoshikawa | ................... 455/463 |
| 5,454,032 A | * | 9/1995 | Pinard et al. | .......... 379/167.05 |
| 5,657,373 A | * | 8/1997 | Hermansson et al. | .... 455/435.2 |
| 5,699,407 A | | 12/1997 | Nguyen | |
| 5,805,582 A | * | 9/1998 | Snelling et al. | ............. 370/337 |
| 5,806,000 A | | 9/1998 | Vo et al. | |
| 5,845,207 A | * | 12/1998 | Amin et al. | .............. 455/414.1 |
| 5,943,620 A | * | 8/1999 | Boltz et al. | .................. 455/445 |
| 6,393,275 B1 | | 5/2002 | Alfred | |
| 6,501,946 B1 | * | 12/2002 | Farah et al. | .............. 455/414.1 |
| 6,580,908 B1 | | 6/2003 | Kroll et al. | |
| 6,671,523 B1 | * | 12/2003 | Niepel et al. | ................ 455/558 |
| 6,859,649 B1 | * | 2/2005 | Denenberg et al. | .......... 455/406 |
| 2001/0041560 A1 | * | 11/2001 | Tarkiainen et al. | ......... 455/414 |

(Continued)

FOREIGN PATENT DOCUMENTS

EP 1 058 465 A2 12/2000

OTHER PUBLICATIONS

U.S. Appl. No. 09/836,521, filed Apr. 17, 2001 entitled "Method and System for Serving Multiple Subscriber Stations Under a Common Subscriber ID".

(Continued)

*Primary Examiner*—Charles Appiah
*Assistant Examiner*—Bryan Fox

(57) ABSTRACT

A system and method for managing multiple mobile stations provisioned for use by a single user with a common mobile identification number (MIN). In an advanced intelligent network, a call control system may receive requests to set one of the multiple mobile stations to an active state. The call control system may also receive requests to set one or more of the multiple mobile stations to an inactive state. The call control system stores the active or inactive indication in a subscriber profile database. When a request is made to register one of the multiple mobile stations for service, the call control system determines if the mobile station is active or inactive. If the mobile station is inactive, it is not permitted to register. If the mobile station is active, it is permitted to register.

25 Claims, 6 Drawing Sheets

U.S. PATENT DOCUMENTS

2002/0153410 A1    10/2002    Santini
2003/0043763 A1     3/2003    Grayson

OTHER PUBLICATIONS

Office Action from U.S. Appl. No. 09/836,521, dated Mar. 29, 2004.
Office Action from U.S. Appl. No. 09/836,521, dated Dec. 19, 2003.
Wireless Review, Faceless Activation, http://www.wirelessreview.com/microsites/magazinearticle.asp?mode=print&magazine-arti . . . , printed from the World Wide Web on Mar. 20, 2003.
Telespree, "Intelligent Service Manager (ISM) and Secure Instant Wireless Access$^{SM}$ Protocol," Technical Overview, 2002.
Telespree, "telespree Intelligent Service Manager—Dynamic Device Activation and Provisioning Software for Wireless Voice & Data Networks," 2002.
Telespree, "Reduce Wireless Activation Costs," http://www.telespree.com/solution2.1¯p.htm, printed from the World Wide Web in Aug. 2003.
Telespree, "Telespree Completes Seamless Integration of Intelligent Activation and Acquisition Solution Over CDMA2000 1X Network," Dec. 2, 2003, http:www.telespree.com/release_12.02.02.htm, printed from the World Wide Web.
"Telespree announce Instant Activation Software for CDMA2000 1X Networks," http://www.3gnewsroom.com/3g_news/oct_02/news_2589.shtml, printed from the World Wide Web on Mar. 20, 2003.
Telespree, "ISM Activation Manager," http://www.telespree.com/products1.2.htm, printed from the World Wide Web on Feb. 18, 2003.
Telespree, "Telespree Secure Instant Wireless Access$^{SM}$ (SIWA$^{SM}$) Protocol," SIWA Overview, Version 1.0, 2002.
WirelessWeek, "Telespree Aims to Cut Activation Costs," Oct. 28, 2002, http://www.wirelessweek.com/index.asp?layout=articlePrint&articleID=CA254726, printed from the World Wide Web.
Lucent Technologies, "Wireless Intelligent Networks—SHLR Authentication Center Utility SPA User's Guide," Issue 6.0, Jun. 2003 (see, e.g., Auth_Failure_Override and Auth_Active_for_Mobile descriptions at pages 38-39, allowing use of duplicate MIN/ESN combination, and allowing bypass of MIN authentication.).
Batelco Press Release 2002—"Thunaii—Two Mobile Phones with the Same Number," http://www.batelco.com.bh/pressinfo/press25-03-2002.htm, Mar. 25, 2002.

\* cited by examiner

METHOD AND SYSTEM FOR CONTROLLING SERVICE TO MULTIPLE MOBILE STATIONS HAVING A COMMON SUBSCRIBER IDENTIFIER

BACKGROUND OF THE INVENTION

1. Related Applications

This application claims priority as a continuation-in-part application to U.S. patent application Ser. No. 09/836,521, "Method and System for Serving Multiple Subscriber Stations Under a Common Subscriber ID," filed on Apr. 17, 2001, which is incorporated in its entirety herein by reference.

2. Field of the Invention

The present invention relates to wireless communications, and more particularly to managing mobile services for wireless devices such as cellular telephones.

3. Description of Related Art

Traditionally, each mobile station in a telecommunications network is identified with a unique Electronic Serial Number (ESN) and a unique Mobile Identification Number (MIN). The ESN, which is typically hard-coded into the mobile station, identifies the mobile station as a unique physical device. The ESN usually includes a manufacturer code and a manufacturer-assigned serial number. The MIN, on the other hand, is typically assigned to the mobile station by a service provider when the mobile station is being provisioned for service. It also typically functions as a subscriber ID for billing and for receiving calls. In many cases, the MIN is a telephone directory number.

The MIN and the ESN may be involved in the initiation of telephone calls involving the mobile station they identify. When a call is placed to a mobile station, a service provider may alert the mobile station by broadcasting a paging message that is keyed to the MIN of the mobile station. The mobile station may then detect its MIN in the paging message and respond to the incoming call. When a call is placed from the mobile station, the mobile station typically transmits both its ESN and its MIN to the service provider. The service provider may then authenticate the ESN/MIN pair and responsively allow the call to proceed.

Mobile stations and service on mobile communications networks have become sufficiently cost-effective and popular that individual users are using multiple mobile stations. Each mobile station has a unique MIN, which means that the individual user must use multiple MINs. For example, a user may have a cellular telephone with one MIN and a PDA wireless modem adapter with another MIN. Having multiple MINs, however, is inconvenient to the user. Multiple MINs traditionally result in multiple bills. Users would also need to consider which mobile station they want to receive calls on when they let others know the telephone directory number (typically the MIN) to one of their mobile stations.

It would be desirable to allow a user to associate a common MIN with multiple mobile stations and to select which of the mobile stations will be active at any given time.

SUMMARY

In view of the above, exemplary embodiments provide systems and methods for configuring a plurality of mobile stations to be used by a user, associating the plurality of mobile stations with a common mobile identification number (MIN), and allowing the user to manage which of the plurality of mobile stations are active or inactive at any given time.

In one aspect of an exemplary embodiment, multiple mobile stations may be configured to be identified by one shared (or common) MIN for all of the mobile stations and a unique Electronic Serial Number (ESN) for each mobile station. For example, when a user of at least one mobile station acquires a new mobile station, the new mobile station may be configured to have the same MIN as that of the first mobile station, although it would still be identified by its own unique ESN. Subscriber profiles created for each mobile station during service provisioning on a wireless network may reflect that each mobile station is identified by the common MIN and by its unique ESN.

In another aspect of an exemplary embodiment, the mobile stations may have the uses or functions designated in their configurations modified by the user. For example, a user may change which of the multiple mobile stations will be permitted to register for service on the wireless network.

In another aspect of an exemplary embodiment, a method is provided to associate a common MIN with a plurality of mobile stations. The method may further provide the steps of receiving a request to identify one of the plurality of mobile stations as being an active mobile station and of identifying the one of the plurality of mobile stations as being the active mobile station. The active mobile station may thereafter be the one of the user's multiple mobile stations that responds to paging messages sent to the common MIN.

In another aspect of an exemplary embodiment, a method is provided for performing the steps of receiving a request to identify one of the plurality of mobile stations as an inactive mobile station and identifying the one of the plurality of mobile stations as being the inactive mobile station. The ability to designate an inactive mobile station advantageously provides a user with a mechanism for preventing a previously active mobile station from responding to paging messages sent to the common MIN.

In another aspect of an exemplary embodiment, the method may provide storing a password associated with the user of the plurality of mobile stations. The method may further provide steps of prompting the user to enter a password and comparing the user input with the stored password. If the user input matches the stored password, the one of the plurality of mobile stations is identified as being active (or inactive, depending on the request). If the user input does not match the stored password, the one of the plurality of mobile stations is not identified as being active (or inactive, depending on the request).

In another aspect of an exemplary embodiment, a system comprises a subscriber profile database and a call control system. The subscriber profile database stores a user's subscriber profile record, which includes a plurality of mobile station identifiers corresponding to a plurality of mobile stations. Each of the plurality of mobile station identifiers may be associated with a common MIN and a status indicator. The call control system is operable to set the status indicator for a selected one of the plurality of mobile stations to an active state or to an inactive state in response to a request. The mobile station that is set to the active state may receive calls keyed to the common MIN and the mobile station that is set to the inactive state may not receive calls keyed to the common MIN.

These as well as other features and advantages will become apparent to those of ordinary skill in the art by reading the following detailed description, with appropriate reference to the accompanying drawings.

BRIEF DESCRIPTION OF THE DRAWINGS

Presently preferred embodiments of the invention are described below in conjunction with the appended figures, wherein like reference numerals refer to like elements in the various figures, and wherein.

DETAILED DESCRIPTION

1. Overview

In accordance with embodiments of the present invention, a system is provided that would permit a user to obtain service for a plurality of mobile stations and have each configured with the same mobile identification number ("MIN"). The user would also be allowed to select a mobile station from the plurality of mobile stations to activate or deactivate at any given time. Only a user's active mobile station would be able to then initiate or receive calls.

Figure 1:
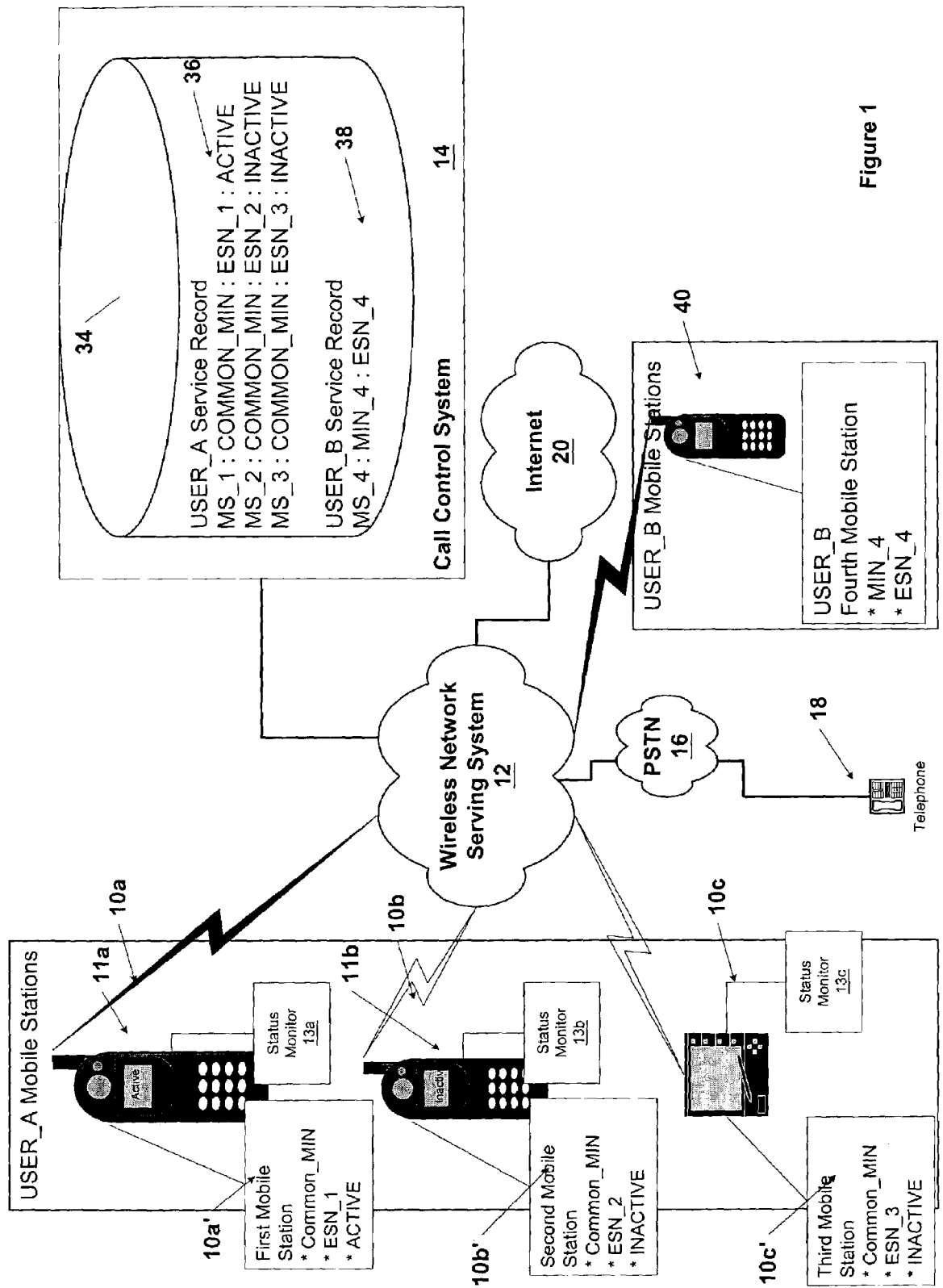
FIG. 1 is a block diagram depicting operation of an exemplary embodiment of the invention.

FIG. 1 shows a system comprising a plurality of mobile stations, including a first mobile station 10a, a second mobile station 10b, a third mobile station 10c and a fourth mobile station 40 operable to communicate over a wireless network 12. The wireless network 12 is communicatively connected to a call control system 14, a public switched telephone network (PSTN) 16 and the Internet 20. FIG. 1 shows an individual, USER_A, to be a user of multiple mobile stations. USER_A's mobile stations are the first mobile station 10a, the second mobile station 10b and the third mobile station 10c. The fourth mobile station 40 is depicted as being used by USER_B.

The call control system 14 manages calls between users of the wireless network 12 or between a user of the wireless network 12 and users of other networks, such as the PSTN 16 or the Internet 20. The call control system 14 is preferably either part of or coupled to a standard signaling system that provides call control and telecommunications services on the wireless network 12. In performing call management functions, such as call initiation, teardown and maintenance, the call control system 14 typically refers to a subscriber profile database 34 for information regarding a user's subscriber profile. The subscriber profile database 34 in FIG. 1 contains an example of a first subscriber profile record 36 for the mobile stations used by USER_A and a second subscriber profile record 38 for the mobile station used by USER_B.

The wireless network 12 may implement a serving system communicatively coupled to a signaling system. The serving system and the signaling system provide telecommunications service to users who have obtained access to the service from a service provider. In an exemplary embodiment, the signaling system provides signaling services available through a Wireless Intelligent Network ("WIN"). The preferred signaling protocol is described in the TIA/EIA Interim Standard 41 ("IS-41") and revisions thereof. A recent revision of this Interim Standard, ANSI-41 Rev. E, and its predecessor, ANSI-41 Rev. D, which was published in July 1997, are fully incorporated herein by reference. Furthermore, extensions to ANSI-41D or WIN triggers and WIN call processing are included in Interim Standard IS-771, which was published July, 1999, and is fully incorporated herein by reference.

The wireless network 12 serving system is preferably CDMA-based, however, serving systems based on TDMA, GSM, AMPS, etc. may also be used. In exemplary embodiments (described below with reference to FIG. 2), the serving system includes a plurality of base transceiver stations (BTS), base station controllers (BSC), and mobile switching centers (MSC). The serving system is coupled to the signaling system via signaling transfer points (STP). The STPs may then be further coupled to the call control system 14, which may comprise a home location register (HLR) and/or a service control point (SCP) along with associated service and trigger logic.

The signaling system preferably employs a standardized set of messages for communication between switches (or other such entities) and the call control system 14 in order to allow for a variety of services. This standardized set of messages may be conveyed, for instance, over an out-of-band common channel interoffice signaling (CCIS) network, according to a signaling protocol. The most well known such protocol is Signaling System #7 ("SS7"). According to SS7, predefined messages may be coded as Transaction Capabilities Application Part ("TCAP") messages and routed via signaling transfer points ("STPs") between the serving system and the signaling system.

The particular message set may vary depending on the type of network. Typical landline AIN networks implement SS7 and the advanced intelligent network ("AIN"), examples of which are embodied in Bellcore's AIN Release 0.1 and AIN Release 0.2. Typical wireless networks may operate according to IS-41 and IS-771.

The call control system 14 may access the subscriber profile database 34 for information regarding subscribers and their mobile stations during call initiation, maintenance and teardown. The information regarding subscribers and their mobile stations may be stored in records created when a subscriber's account is created and modified when the subscriber modifies his service (e.g. by adding or configuring a new mobile station for service). The information relating to the mobile stations may be stored in records that include the information shown in Table 1.

TABLE 1

| Mobile Station | ESN | MIN |
|---|---|---|
| 1 | ESN_1 | MS_MIN_1 |
| 2 | ESN_2 | MS_MIN_2 |
| 3 | ESN_3 | MS_MIN_3 |

As shown in Table 1, each mobile station may be identified with a unique mobile station identifier known by those of ordinary skill in the art as an Electronic Serial Number (ESN) and with a Mobile Identification Number (MIN). The ESN is typically hard-coded into the mobile station and usually includes a manufacturer code and a manufacturer-assigned serial number. The MIN is typically assigned to the mobile station by the service provider. It also typically functions as a subscriber ID for billing and for receiving calls. In many cases, the MIN is a telephone directory number.

The MIN and the ESN are typically involved in the initiation of telephone calls involving the mobile station they identify. When a call is initiated from a mobile station, the mobile station typically transmits both its ESN and its MIN to the service provider. The service provider may then authenticate the ESN/MIN pair and responsively allow the call to proceed. Authentication may involve reference to the user's subscriber profile.

When a call is placed to the mobile station, the service provider may alert the mobile station by broadcasting a paging message that is keyed to the mobile station's MIN. The paging message may also include parameters such as a parameter that identifies a traffic channel to which the mobile station should tune to connect the call, a directive (e.g. a BYPASS_ALERT_ANSWER (BAA) flag) for the mobile station to tune to the designated channel, and a directive (e.g. a CALL_ALERT_INDICATOR (CAI) flag) for the mobile station to ring. The mobile station may then detect its MIN in the paging message and follow the directives associated with the incoming call. Typically, the MIN is also a unique identifier. Therefore, when a call is placed to a specific MIN, only one mobile station would typically respond.

In exemplary embodiments, multiple mobile stations share a common MIN. The common MIN assigned to each of the user's mobile stations may be included in the mobile station information in the subscriber profile database 34. The subscriber profile database 34 may also include a status indicator for each mobile station to indicate whether the mobile station is active or inactive at any given time. Users may access the status indicator to selectively configure the user's multiple mobile stations. That is, users may make requests to configure a selected one of the mobile stations as being active or inactive.

In an exemplary embodiment, the status of a mobile station indicates its ability to register, or obtain service on the wireless network. Typically, a mobile station must register with the wireless network before it is able to place or receive calls. A mobile station may attempt to register when it powers up in the wireless coverage area of the network. A mobile station may also attempt to register as a result of a handoff to a wireless network. In some wireless networks, mobile stations may also be programmed to request registration with a network periodically. In a preferred embodiment, an active mobile station is allowed by the system to register and an inactive mobile station is not allowed to register. Accordingly, only active mobile stations may obtain service on the wireless network such that only active mobile stations will be allowed to initiate or receive calls.

2. Mobile Station Information for Users of Multiple Mobile Stations

Table 2 shows the mobile station information in the subscriber profile 36 for a user (e.g. USER_A) that uses multiple mobile stations identified by a common MIN.

TABLE 2

| Mobile Station | ESN | MIN | Status Indicator |
|---|---|---|---|
| 1 | ESN_1 | COMMON_MIN | ACTIVE or INACTIVE |
| 2 | ESN_2 | COMMON_MIN | ACTIVE or INACTIVE |
| 3 | ESN_3 | COMMON_MIN | ACTIVE or INACTIVE |

As shown in Table 2, USER_A's mobile stations are identified by a unique ESN and a common MIN. USER_A's mobile stations also each have a status indicator that may have a value indicating an active status or an inactive status as shown in Table 2.

In an exemplary embodiment, the mobile station status indicator may be set to one of two predetermined values to indicate ACTIVE or INACTIVE. If the status indicator is set to ACTIVE, then the mobile station it refers to is activated such that it may initiate and respond to calls over the wireless network. If the mobile station indicator is set to INACTIVE, then the mobile station it refers to does not receive calls keyed to the common MIN. Preferably, only one of the user's mobile stations identified by the common MIN may be active at any time.

In an exemplary embodiment, the ACTIVE/INACTIVE status of a mobile station indicates whether or not the mobile station may be permitted to register with the wireless network. Alternatively, the status indicator may be checked during call setup. That is, during call origination, the status indicator may be checked to determine if the mobile station from which the call is originating is active. If it is, then the call may proceed. If the mobile station is inactive, the call will not be permitted.

FIG. 1 shows an example of a subscriber profile for a user of three mobile stations having a common MIN. Referring to FIG. 1, the subscriber profile for USER_A in subscriber profile database 34 shows that the first mobile station 10a is identified by COMMON_MIN and ESN_1, and has its mobile station indicator set to ACTIVE. The second and third mobile stations 10b and 10c are identified by COMMON_MIN and by the unique ESN's, ESN_2 and ESN_3, respectively. The mobile station indicators for the second and third mobile stations 10b, 10c are each set to INACTIVE. While USER_A has three mobile stations, the first mobile station 10a is USER_A's active mobile station. That is, the first mobile station 10a has been configured to be active and the other two mobile stations 10b, 10c have been configured to be inactive.

Optionally, the mobile stations 10a, 10b, 10c may store information that locally reflects the subscriber profile mobile station information. USER_A's plurality of mobile stations 10a, 10b, 10c and USER_B's mobile station 40 may have mobile station records 10a', 10b', 10c', and 40' that correspond with the information stored for each mobile station in the user's subscriber profile 36, 38. The mobile station records 10a', 10b', 10c' may be stored as data records in memory in the mobile stations 10a, 10b, 10c to reflect locally the status of each mobile station in the subscriber profile database 34. The local maintenance of mobile station records 10a', 10b', 10c' permits operation with an embodiment in which the mobile station status indicator is checked during call setup. Optionally, the mobile station records 10a', 10b', 10c' may include a local indication of the state of the status indicator. In one exemplary embodiment, the mobile stations may refer to this local status indication to determine whether to respond to a broadcast paging message keyed to the common MIN.

Figure 2:
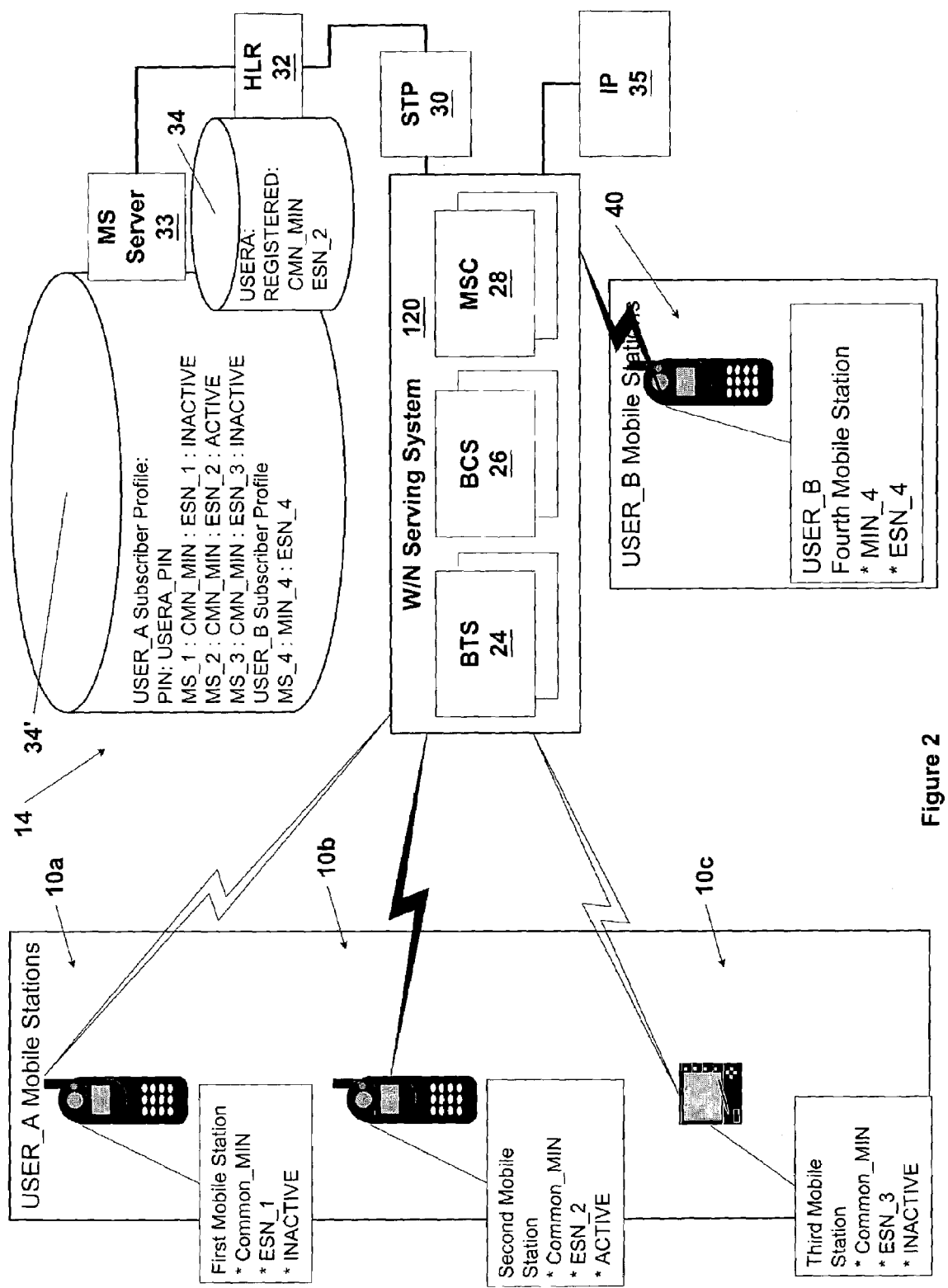
FIG. 2 is a block diagram depicting operation of another exemplary embodiment of the invention.

3. Requests to Activate/Deactivate Mobile Stations in an Exemplary Wireless Network In exemplary embodiments, a wireless network implements services that permit users to make requests to activate or deactivate a mobile station. FIG. 2 illustrates operation of an exemplary wireless network that may provide such services. The wireless network is briefly described below to better illustrate how the services may be implemented.

Exemplary embodiments of the services will then be described with reference to FIGS. 2 and 3. An alternative embodiment is described with reference to FIG. 4. One of ordinary skill in the art will appreciate, however, that these embodiments are examples. Other examples may be used as well.

A. An Exemplary Wireless Network

FIG. 2 shows an exemplary wireless network in which user-generated requests to activate or deactivate a mobile station may be advantageously implemented. The embodiment shown in FIG. 2 includes a wireless network serving system 120 and the call control system 14. The call control system 14 comprises components from a signaling system such as a signaling transfer point (STP) 30, a home location register (HLR) 32 and the subscriber profile database 34. In an exemplary embodiment, the call control system 14 also includes a multiple mobile station server 33, which implements functions associated with managing aspects of a user's service associated with having multiple mobile stations. The serving system 120 in FIG. 2 is coupled to the signaling system at the STP 30. The serving system 120 may also be coupled to an Intelligent Peripheral (IP) 35, which may provide resources that may be used in exemplary embodiments.

The HLR 32 obtains parameters defining services, attributes, locations and states of subscribers and terminals from the subscriber profile database 34. In exemplary embodiments, the subscriber profile database 34 also includes the mobile station information described above with reference to Table 2. An additional record may be added to the subscriber profile database 34 indicating a registered mobile station ("the registered mobile station record"). For example, in FIG. 2, the subscriber profile database 34 shows that the registered mobile station is the second mobile station 10b identified by ESN_2. The registered mobile station record stores the ESN of the mobile station that is active and registered to make and receive calls. When a mobile station is designated as being active, its ESN is stored in the registered mobile station record in the HLR. The registered mobile station record may also be checked when a mobile station powers up or is handed off to another cell. If the mobile station's ESN is not in the registered mobile station record, it is not permitted to register. Otherwise, the mobile station is permitted to register so that it makes and receives calls.

The mobile station information described above with reference to Table 2 may also be stored in a multiple mobile station database 34' which is accessed via the multiple mobile stations server 33. The HLR 32 communicates with the multiple MS server 33 to establish which of the user's mobile stations is active and to set the remaining ones as inactive.

One of ordinary skill in the art will appreciate that the multiple mobile station server 33 may be implemented as a software component residing within the HLR 32. Functions associated with managing multiple mobile stations (e.g. Activation/Deactivation functions described below with reference to FIG. 2) may then be incorporated as functions of the HLR 32, or as an added service. Alternatively, the multiple mobile station server 33 may be implemented on a separate device that has a signaling system interface to the HLR 32. Functions associated with managing multiple mobile stations may then be accessed using inter-network messaging. For example, the multiple mobile station server 33 may be incorporated within the signaling system and be accessible by signaling messages.

In a preferred embodiment, the serving system 120 is a wireless telecommunications network that uses CDMA and is compatible with industry standard IS-95. The call control system 14 is a WIN-based signaling system compatible with ANSI-41 and any relevant extensions such as IS-771. In accordance with the capabilities of WIN-based signaling systems, one of ordinary skill in the art will appreciate that other components may perform the functions attributed in this description to the components described above. For example, the MSC 28 may incorporate or communicate or be replaced with a Visitor Location Register (VLR). Similarly, the HLR 32 may incorporate or communicate or be replaced with an SCP (Service Control Point). The serving system 120 includes at least one base transceiver station (BTS) 24, at least one base station controller (BSC), and at least one mobile switching center (MSC) 28. One of ordinary skill in the art will also appreciate that the wireless network described with reference to FIG. 2 is just one example of the type of network in which advantageous use of exemplary embodiments may be made. Other examples are also possible.

The BTS 24 establishes a radiation pattern that defines a cell site. The BTS 24 may then communicate with mobile stations 10a, 10b, 10c that are within the cell site via an air interface. One or more BTS's 24 may be coupled with the BSC 26, which may then be coupled with the MSC 28. The MSC 28 is coupled to the signaling system at the STP 30.

The serving system 120 also includes service logic that defines how to process calls involving mobile stations within its cell. The service logic may be stored in the MSC 28 (or in the VLR (not shown)). The service logic may include a number of trigger points that cause the serving system 120 to request services from the signaling system. When a trigger is encountered, the serving system may pause call processing and send a signaling message with various parameters via STP 30 to HLR 32. For calls originating from one of the mobile stations 10a, 10b, 10c, the signaling message may contain an identification of the mobile station (i.e. the common MIN and/or the ESN) and the digit sequence dialed by the user. For calls terminating at the one of the mobile stations 10a, 10b, 10c, the signaling message may contain an identification of the mobile station 10a, 10b, 10c and a MIN or directory number of the calling party. Typically, the signaling message for terminating calls contains only the mobile station's MIN.

One of ordinary skill in the art will appreciate that while only one BTS 24, one BSC 26 and one MSC 28 are described with reference to FIG. 2, the serving system 120 may actually include more than one of each component. Thus, for instance, USER_B mobile station 40 may be in a different cell than mobile station 10a and may connect via a second BTS, a second BSC and a second MSC.

Examples of networks that may be advantageously used in exemplary embodiments are also described in U.S. patent application Ser. No. 09/411,885, "System for Managing Telecommunications Services Through Use of Customized Profile Management Codes," filed Oct. 4, 1999, which is incorporated in its entirety herein by reference.

B. Requests to Activate or Deactivate a Mobile Station

In exemplary embodiments, users make requests to activate or deactivate a selected one of multiple mobile stations that share a common MIN using a feature code. Feature codes are specific digit sequences defined by a service provider to activate, deactivate or modify particular service features. A feature code usually consists of a preceding asterisk or double asterisk followed by a series of numeric digits (e.g. "*nnn" or "**nnn"). In exemplary embodiments, one or more feature codes may be defined to allow a user to request activation or deactivation of a mobile station.

Feature codes may be used for a service to request activation or deactivation in a variety of ways. The service provider may provide one feature code to request activation of a mobile station and a different feature code to request deactivation of a mobile station. Users may be required to dial feature codes from the mobile station being activated or deactivated. The service may also be implemented with a feature code that allows a user to use a mobile station to activate or deactivate other mobile stations that share the common MIN. The service provider may also provide one feature code to request that the state of a selected mobile station be toggled, or switched to the opposite of its current state. An active mobile station would be switched to inactive and vice versa.

In a preferred embodiment, only one mobile station may be active at any given time. In an exemplary activation/deactivation scheme, the service provider provides one feature code to simultaneously request activation of a selected mobile station and deactivation of the other mobile stations. Simultaneous activation and deactivation permits a user to manage multiple mobile stations without having access to each mobile station while changing their status. For example, USER_A may leave the first mobile station 10a at home and travel to a different part of the country with the second mobile station 10b. Simultaneous activation/deactivation allows USER_A to activate the second mobile station 10b and deactivate the first mobile station 10a using the second mobile station 10b. Such a feature code would preferably be implemented to require that the user enter a password, or personal identification number ("PIN") to prevent unauthorized users from activating or deactivating a user's mobile station. Secure environment such as encrypted connections to the serving system and/or the signaling system may also be used to increase security during activation/deactivation.

Figure 3A:
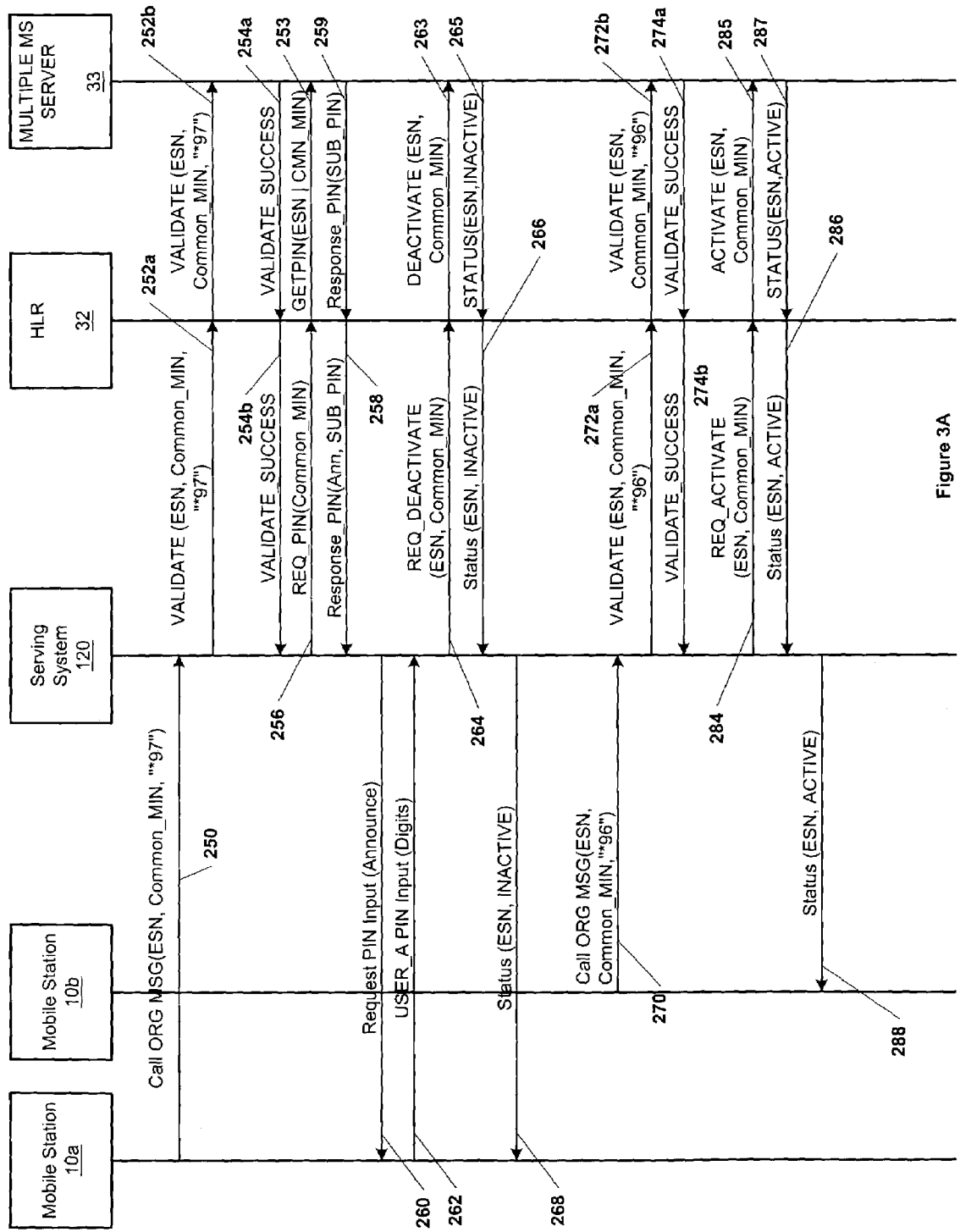
FIG. 3A is a message flow diagram depicting operation of an exemplary embodiment of the invention using distinct feature codes for the deactivation and activation functions.
Figure 3B:
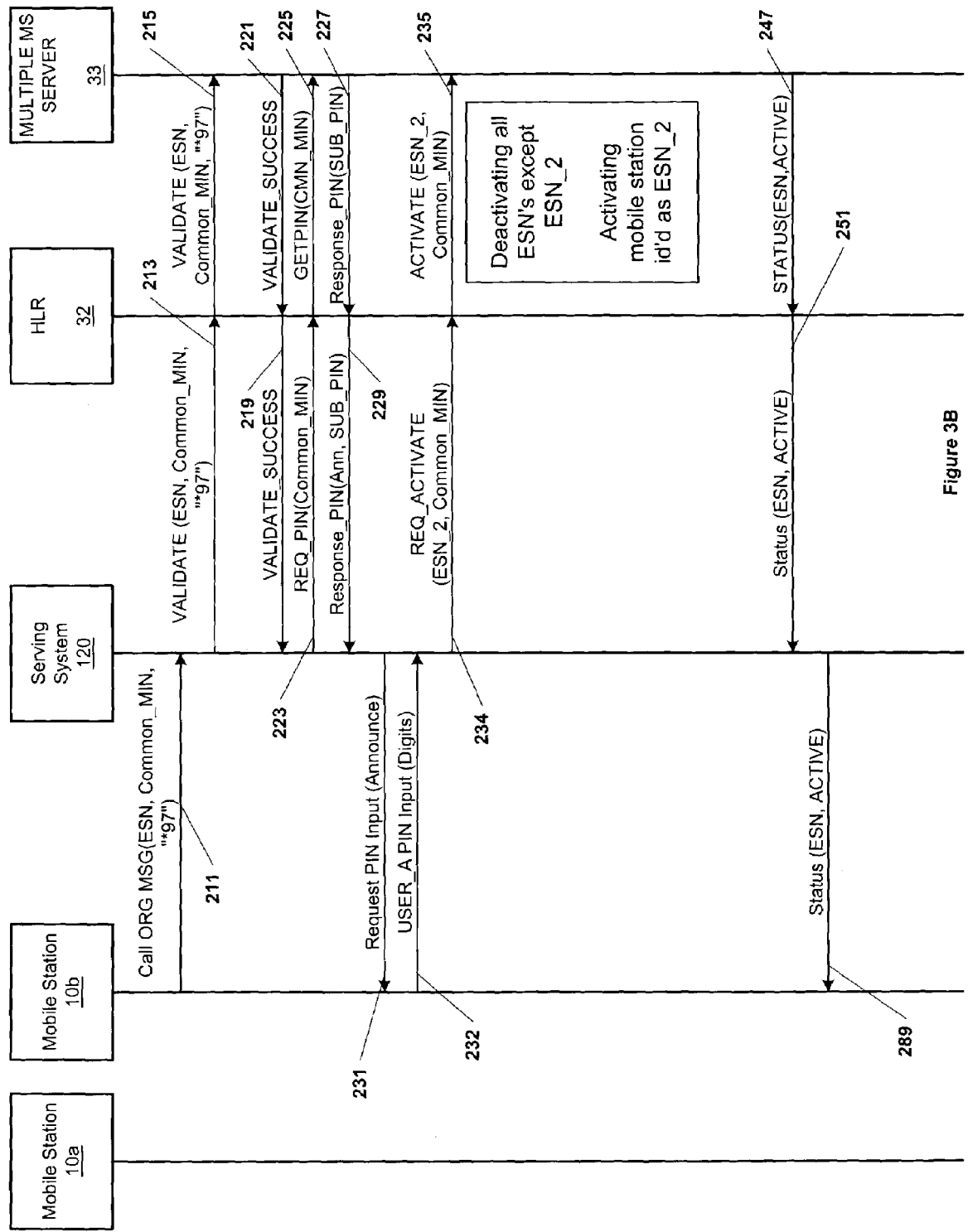
FIG. 3B is a message flow diagram depicting operation of an exemplary embodiment of the invention using a single feature code to simultaneously activate one mobile station and deactivate the remaining mobile stations.

FIGS. 3A and 3B illustrate alternative embodiments for implementing feature codes to activate and deactivate mobile stations. FIG. 3A shows examples of messages that may be used in requests to activate and/or deactivate a mobile station using one feature code for deactivating and a different feature code for activating a mobile station. FIG. 3B shows messages that may be used with one feature code for simultaneously activating the requesting mobile station and deactivating the other mobile stations. FIGS. 3A and 3B show messages in a generic "pseudo-code" format to convey the functions being carried out by the messages and to illustrate that embodiments of the present invention are not limited to any specific infrastructure. However, in preferred embodiments, messages having a counter-part in a standard signaling message format (e.g. the call origination message), such as IS-41, are implemented with such counter-parts. Messages that do not have counter-parts may be implemented as extensions to the selected standard.

Referring to FIG. 3A, USER_A dials a first feature code to activate a selected mobile station and a second feature code to deactivate a selected mobile station. The first feature code may be, for example, "*96" and the second feature code may be, for example, "*97." The first mobile station 10a is initially ACTIVE and the second mobile station 10b is initially INACTIVE as shown in FIG. 1. USER_A desires to activate the second mobile station 10b and deactivate the first mobile station 10a. In accordance with the example illustrated by FIG. 3A, USER_A deactivates the first mobile station 10a before activating the second mobile station 10b as described below.

Referring to FIG. 3A, USER_A begins the process of deactivating the first mobile station 10a by dialing "*97" on the first mobile station 10a. The first mobile station 10a sends a call origination message 250 containing its MIN (i.e. common MIN), its ESN and the dialed digits (i.e. "*97") to the serving system 120. The serving system 120 receives the call origination message and sends a validation request message 252a to the HLR 32 to verify that the call origination message parameters, the MIN and ESN, identify a mobile station authorized to use the serving system 120. The HLR 32 may determine by reference to the subscriber profile database 34 that the common MIN and ESN are in a subscriber profile belonging to an authorized user. The HLR 32 may pass the validation step on by sending a second validation message 252b to the multiple MS server 33.

If the validation of the call origination message is successful, the multiple MS server 33 may send a first validation status message 254a to the HLR 32. The HLR 32 may then notify the serving station 120 by sending a second validation status message 254b. If the validation was successful, the service logic in the serving system 120 continues to process the call. In the process, the service logic may encounter one or more triggers, which causes the serving station 120 to send a signaling message 264 to the HLR 32. The message 264 includes a request to deactivate and parameters that include the common MIN and the ESN. The HLR 32 sends a deactivate message 263 to the multiple MS server 33, which looks up the mobile station information record associated with the ESN and sets the status indicator for the mobile station identified by the ESN to the INACTIVE state. The multiple MS server 33 sends a first status message 265 to the HLR 32. The HLR 32 preferably sets the status indicator for the ESN in the subscriber profile database 34 to INACTIVE. The HLR 32 may also send a second status message 266 to the serving system 120.

In preferred embodiments, the mobile station activation and deactivation functions are password protected. Password protection may be implemented by service logic in the serving system 120 prior to processing any service logic or triggers that perform the functions to activate or deactivate the mobile station. For example, the user may have a Personal Identification Number (PIN) as part of the user's telecommunications service. The PIN may be used with specific features as a way of providing the user with private access to those services. Well-known services that provide users with access protected by a PIN include voice mail and restricted call access.

Password protection in exemplary embodiments may be implemented with service logic in the serving system 120 that causes a query to the HLR 32 for a subscriber PIN for the subscriber identified as the user of the mobile station identified by the common MIN. The query may be implemented as a signaling message 256 to request a PIN for the user identified by the common MIN. In response, the HLR 32 preferably retrieves a PIN from the multiple MS server 33 by sending a PIN request message 253. The multiple MS server 33 retrieves a digit string stored in the subscriber profile database 34 that represents the user's PIN and sends it back to the HLR 32 in a response message 259. The HLR 32 sends a PIN response message 258 back to the serving system 120. The PIN response message 258 may contain a digit string representing the user's PIN. The message 258 may also contain data, such as an audio message that may be played to announce the prompt for the user to enter his PIN.

Alternatively, the user's PIN may be part of the user's locally available subscriber profile in the MSC 28 (or VLR) precluding the need to query the HLR 32 or the multiple MS server 33. The serving system 120 sends a PIN input request message 260 to prompt the user to enter a PIN input. The service logic in the serving system 120 may then compare the user PIN input with the expected subscriber PIN. If the PIN input matches the subscriber PIN, then call processing continues. If there is no match, then an exception notification may be sent to the user, or the call may simply end.

The password protection functions described above may also be implemented by, or in conjunction with, the IP 35 or a service node (not shown). For instance, the serving system 120 may send a message to the IP 35 that requests that the IP 35 perform a password query and password validation. The serving system 120 may cease call processing until it receives an indication of whether or not the user successfully entered the password.

When the request to deactivate the first mobile station 10*a* successfully finishes, the status indicator for the first mobile station 10*a* is left in the INACTIVE state as shown in FIG. 2. As an INACTIVE mobile station, the first mobile station 10*a* may not register for service on the wireless network. In exemplary embodiments, a status message may be sent to the serving station 120 at message 266, which may be sent to the user at message 268 indicating a successful deactivation of the first mobile station 10*a*, or an unsuccessful deactivation if the request was not successfully processed. For example, if the user's password entry failed, a status message may be returned to the user indicating that the password was not recognized.

The user may also perform a request to activate one of the other mobile stations. Assuming for purposes of illustration that the user wants to activate the second mobile station 10*b*, the user may do so by dialing the feature code to request activation (i.e. "*96" in this example) on the second mobile station 10*b*. The second mobile station 10*b* sends a call origination message 270 to the serving system 120. The call origination message 270 may include the common MIN, the second mobile station ESN and the dialed digits (i.e. *96 or the feature code for the request to activate). The serving system 120 sends a validate message 272*a* to validate the call origination message to the HLR 32. The HLR 32 sends a second message 272*b* to validate the call origination message to the multiple MS server 33. The response messages 274*a, b* are sent back to the serving system 120 indicating successful (or, unsuccessful) validation.

The request to activate service may also require that the user enter a PIN. If so, the serving system 120 may exchange messages with the HLR 32 and with the second mobile station 10*b* to request and validate a user's PIN in the manner described above with respect to the request to deactivate.

If the validation of the second call origination message is successful, the service logic in the MSC 28 continues to process the call. In the process, the service logic may encounter a trigger, which causes the MSC 28 to send a signaling message 284 to the HLR 32. The message 284 may include a parameter indicative of a request to activate, the common MIN and the ESN. The HLR 32 sends the request to activate message 285 to the multiple MS server 33. The multiple MS server 33 looks up the mobile station information record associated with the ESN and sets the status indicator for the mobile station identified by the ESN to the ACTIVE state. The multiple MS server 33 then sends the status message 287 back to the HLR 32. The HLR sets the status indicator for the ESN to ACTIVE in the subscriber profile database 34 and sends a second status message 286 back to the serving system 120. The HLR 32 may also set the registered mobile station record to identify which mobile station may register for service, and therefore, make and receive calls.

When the request to activate the second mobile station 10*b* is successfully completed, the status indicator for the second mobile station 10*b* is left in the ACTIVE state as shown in FIG. 2. The second mobile station 10*b* will then be allowed to register the next time it sends a request to register. Alternatively, the HLR 32 may perform the process of registering the second mobile station 10*b* in conjunction with activating it. Optionally, a status message may be sent to the MSC 28 at message 286, which may be sent to the user at message 288 indicating a successful activation of the second mobile station 10*b*, or an unsuccessful activation if the request was not successfully processed. The request may not have been successful if, for example, the user's password entry failed.

FIG. 3B illustrates an alternative exemplary embodiment in which one feature code is defined to implement a simultaneous activation and deactivation function. For example, the user may press such a feature code (e.g. "*97") using the mobile station that the user wishes to set to active. In the example shown in FIG. 3B, the user uses the second mobile station 10*b*. The feature code may be validated using, for example, messages 213, 215, 219 and 221 as described above with reference to FIG. 3A. In addition, messages 223, 225, 227 and 229 implement a request for a PIN as described above with reference to FIG. 3A.

If the validation and PIN request steps are successful, the requesting mobile station is activated and all of the mobile stations except the requesting mobile station (in FIG. 3B it is the second mobile station 10*b*) are deactivated. Activation and deactivation may be implemented simultaneously by sending a single request to activate message 234 to the HLR 32. The HLR 32 preferably sends an activate message 235 on to the multiple MS server 33. Messages 234 and 235 may contain the ESN of the requesting mobile station (10*b*) as a parameter. In the present example, the ESN is ESN_2.

Upon receiving the activate message 235, the multiple MS server 33 may first deactivate all of the mobile stations having the Common_MIN and then activate the mobile station (10*b*) that made the call. The multiple MS server 33 deactivates the mobile stations by setting their status indicators to INACTIVE. The multiple MS server 33 activates the mobile station 10*b* by setting its status indicator to ACTIVE. The multiple MS server 33 may then send a status message 247 to the HLR 32. The HLR 32 preferably updates its subscriber profile database 34 by reflecting the new active and inactive mobile stations. The HLR 32 may also set a registered mobile station record to reflect that the second mobile station 10*b* is the only one of USER_A's mobile stations that may be allowed to register. The HLR 32 may also perform the steps of registering the second mobile station 10*b* as it sends a status message 251 to the serving system 120 as a response to the request to activate message 234.

One of ordinary skill in the art will appreciate that FIGS. 3A and 3B illustrate examples of message flows that may be implemented to manage multiple mobile stations that are identified by a common MIN. Other examples may be possible.

Figure 4:
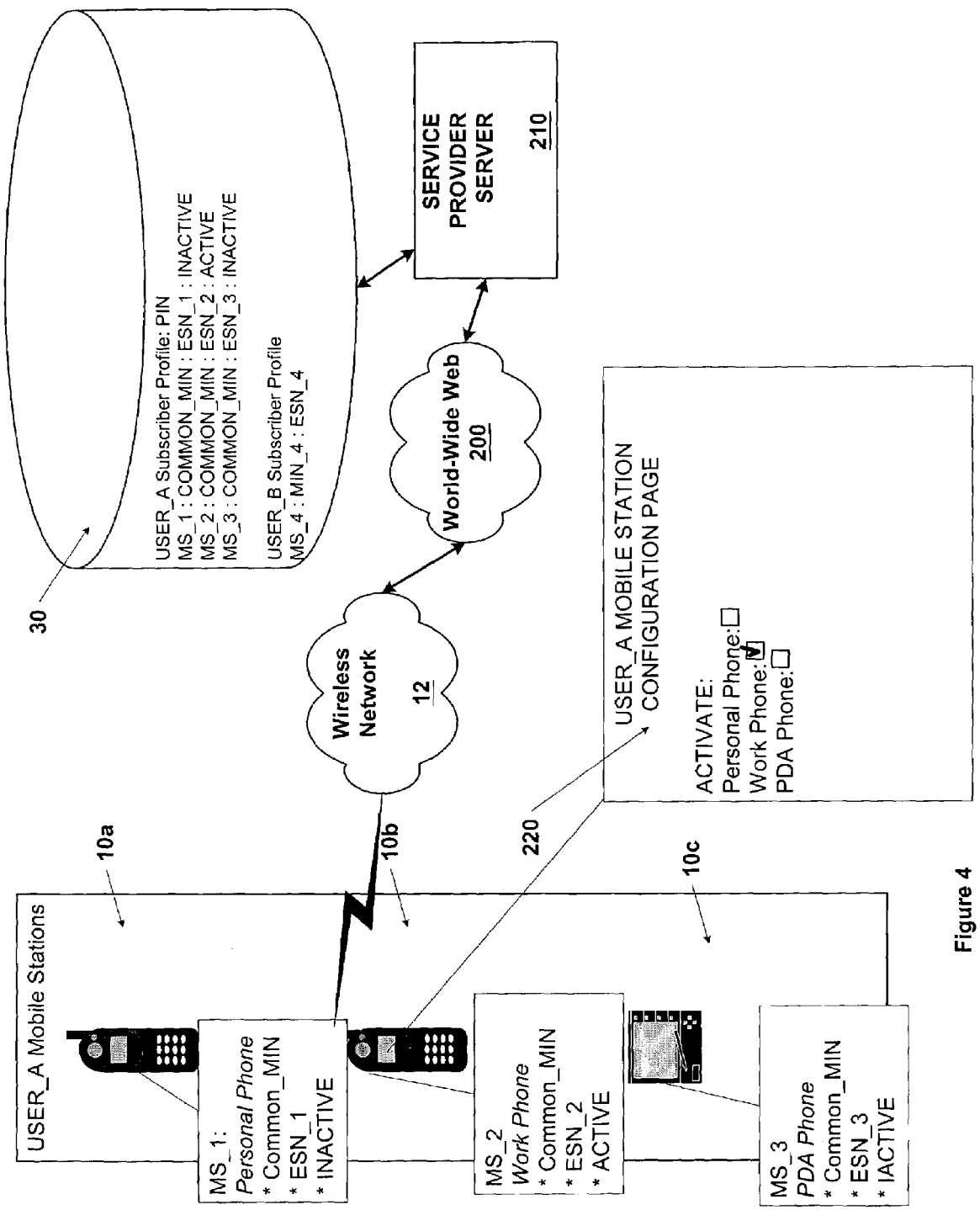
FIG. 4 is a block diagram depicting operation of another exemplary embodiment of the invention.

FIG. 4 depicts operation of an alternative embodiment of an interface to the mobile station information in the subscriber profile database 34. The interface in FIG. 4 implements a web page 220 on the World Wide Web 200 over the Internet. The web page 220 may be accessed by a computer or by a mobile station, such as the third mobile station 10c (e.g. wireless PDA with Internet connectivity) by connection to a service provider server 210. In exemplary embodiments, the computer or the third mobile station 10c is addressable on the Internet using a data network interface. In one embodiment, the data network interface may require that the third mobile station 10c be accessed via a network address such as an IP address based on the Internet Protocol. As shown in FIG. 1, the wireless network 12 is connected to the Internet 20. One of ordinary skill in the art would understand how connections may be made by an IP-provisioned mobile station over the Internet 12.

Referring to FIG. 4, a service provider may provide a form on the web page 220 that may be presented to the user to selectively activate one mobile station and deactivate others. As shown in FIG. 4, the user has activated the second mobile station 10b. In one exemplary embodiment, the web page 220 provides a user with the option of scheduling activation and deactivation times for each mobile station. The web page 220 may be formatted in standard markup language that is suitable for the display on the mobile station. Examples include HTML, WAP, HDML, CML, etc.

FIGS. 2 and 4 show the status indicators for the first mobile station 10a and the second mobile station 10b after they have been set to INACTIVE and ACTIVE, respectively. The above description with reference to FIGS. 3 and 4 show how the status indicators may be modified under user control to set a mobile station to active or inactive status. As described below with reference to FIG. 5, the status indicators may be used in exemplary embodiments to control which mobile stations may be connected to calls on the wireless network.

3. Using the Status Indicator to Direct Calls to the Active Mobile Station

Figure 5:
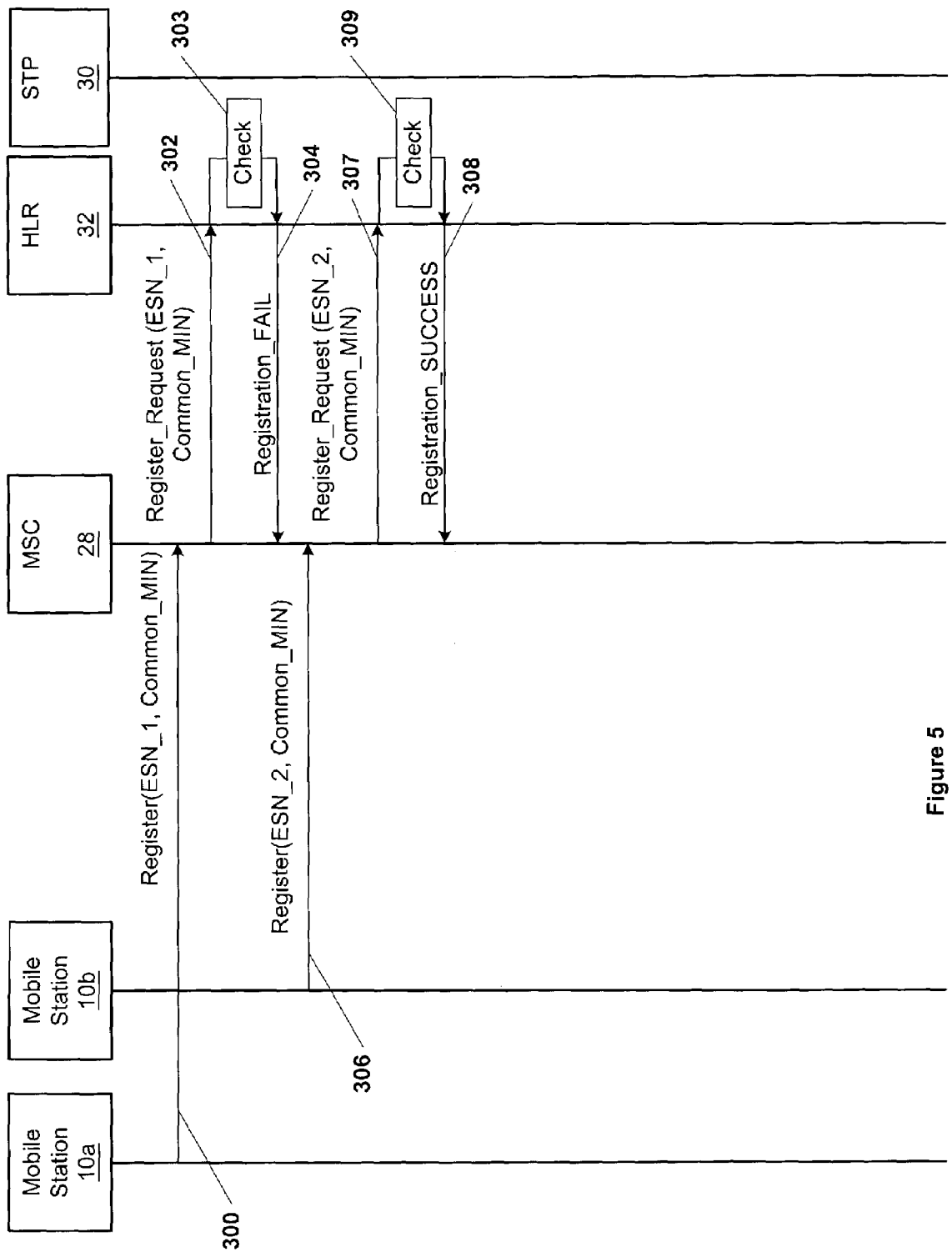
FIG. 5 is a message flow diagram depicting call origination and call termination messages to mobile stations that share a common MIN.

FIG. 5 depicts operation of a system that allows users to activate and deactivate mobile stations that share a common MIN. FIG. 5 illustrates how the status indicator may be used to enable calls to an active mobile station and inhibit calls to an inactive mobile station. The message flow in FIG. 5 assumes that the user has set the first mobile station 10a to INACTIVE and the second mobile station 10b to ACTIVE. In exemplary embodiments, the status of a mobile station indicates the ability of the mobile station to register for service.

With respect to the INACTIVE mobile station 10a, its inactive status will not permit it to register for service. Without the ability to register for service, the first mobile station 10a will not be able to make or receive calls. FIG. 5 shows an example of how the inactive status denies the first mobile station 10a the ability to register.

In typical wireless networks, the registration process begins automatically when a mobile station powers up and sends a registration request message. In FIG. 5, the first mobile station 10a sends a registration request message 300 to the MSC 28, which sends the request on to the HLR 32 using a request message 302. The registration request message 302 contains the ESN for the requesting mobile station, which in this case is ESN_1, as well as the common_MIN. The HLR 32 receives the request and checks (at 303) the subscriber profile record for the user of the first mobile station 10a to determine if the first mobile station 10a is active. If the first mobile station 10a is inactive, the HLR 32 responds to the registration request with a message 304, which indicates that the registration attempt failed.

In exemplary embodiments, a registered mobile station record associated with the user in the subscriber profile database 34 (shown in FIG. 2) may be maintained to indicate whether the ESN in the registration message is permitted to register. When the user activates a mobile station, the registered mobile station record may be set to indicate the activated mobile station's ESN. In FIG. 5, for example, the registered mobile station record for USER_A does not contain the ESN (ESN_1 in this example) for the first mobile station 10a. In an alternative embodiment, the HLR 32 may refer to the status indicator to determine whether a mobile station is permitted to register. Optionally, a status message (not shown) may be sent back to the first mobile station 10a in response to its attempt to register.

Referring to FIG. 5, the second mobile station 10b sends a registration request message 306 when it is, for example, powered up. The MSC 28 sends a registration request message 307 to the HLR 32 with the second mobile station 10b ESN (ESN_2). The HLR 32 receives the request and checks (at 309) the subscriber profile record for the user of the second mobile station 10b to determine if it is active. In this example, the second mobile station 10b has been set to be active. It has also been permitted to register by setting its ESN in the registered mobile station record in the subscriber profile database 34. A message indicating successful registration 308 may then be returned to the MSC 28. The second mobile station 10 may now make or receive calls as USER_A's active mobile station.

Preferred embodiments of the present invention have been illustrated and described. It will be understood, however, that changes and modifications may be made to the invention without deviating from the spirit and scope of the invention, as defined by the following claims.

We claim:

1. A method comprising the steps of:

storing a common mobile identification number (MIN) in a subscriber profile record corresponding to a plurality of mobile stations on a wireless network;

storing a plurality of unique electronic serial numbers (ESN) each corresponding to one of the plurality of mobile stations in the subscriber profile record;

storing a plurality of status indicators each corresponding to one of the plurality of mobile stations, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network;

receiving a request to set the status indicator corresponding to a selected one of the plurality of mobile stations to the first state; and responsive to receiving the request, setting the status indicator corresponding to the selected mobile station to the first state.

2. The method of claim 1 wherein the step of setting the status indicator corresponding to the selected mobile station to the first state comprises the step of storing a first value indicative of the first state in the status indicator corresponding to the selected mobile station.

3. The method of claim 1 further comprising the steps of:
  receiving a request to set the status indicator corresponding to a second selected one of the plurality of mobile stations to the second state; and
  setting the status indicator corresponding to the second selected mobile station to the second state.

4. The method of claim 1 further comprising the step of:
  storing a registered mobile station record in the subscriber profile record identifying the selected mobile station as the mobile station having its corresponding status indicator set to the first state.

5. A method comprising the steps of:
  storing a common mobile identification number (MIN) in a subscriber profile record corresponding to a plurality of mobile stations on a wireless network;
  storing a plurality of unique electronic serial numbers (ESN) each corresponding to one of the plurality of mobile stations in the subscriber profile record;
  storing a plurality of status indicators each corresponding to one of the plurality of mobile stations, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network;
  receiving a request to set the status indicator corresponding to a selected one of the plurality of mobile stations to the first state;
  responsive to the request, setting the status indicator corresponding to the selected mobile station to the first state;
  receiving a registration request message from a requesting mobile station, the registration request message comprising the unique ESN and the common MIN to identify the requesting mobile station to the wireless network;
  checking the status indicator corresponding to the requesting mobile station;
  if the status indicator corresponding to the requesting mobile station is set to the first state, sending a response message in response to the registration request message indicating a successful registration and registering the requesting mobile station on the wireless network; and
  if the status indicator corresponding to the requesting mobile station is set to the second state, responding to the registration request message without registering the requesting mobile station on the wireless network.

6. The method of claim 5 wherein the step of checking the status indicator corresponding to the requesting mobile station comprises the step of checking a registered mobile station record in the subscriber profile record.

7. A method comprising the steps of:
  storing a common mobile identification number (MIN) in a subscriber profile record corresponding to a plurality of mobile stations on a wireless network;
  storing a plurality of unique electronic serial numbers (ESN) each corresponding to one of the plurality of mobile stations in the subscriber profile record;
  storing a plurality of status indicators each corresponding to one of the plurality of mobile stations, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network;
  receiving a request to set the status indicator corresponding to a selected one of the plurality of mobile stations to the first state;
  responsive to the request, setting the status indicator corresponding to the selected mobile station to the first state; and
  setting the status indicator corresponding to at least one mobile station that is not the selected mobile station to the second state.

8. The method of claim 7 wherein the step of setting the status indicator corresponding to the at least one mobile station that is not the selected mobile station to the second state comprises the step of storing a second value indicative of the second state in the status indicator corresponding to the at least one mobile station that is not the selected mobile station.

9. The method of claim 7 wherein the step of setting the status indicator corresponding to the at least one mobile station that is not the selected mobile station to the second state comprises the step of setting the status indicators corresponding to all of the remaining mobile stations except the selected mobile station to the second state.

10. A method comprising the steps of:
  storing a common mobile identification number (MIN) in a subscriber profile record corresponding to a plurality of mobile stations on a wireless network;
  storing a plurality of status indicators each corresponding to one of the plurality of mobile stations, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network;
  storing a user password in the subscriber profile record;
  receiving a request to set the status indicator corresponding to a selected one of the plurality of mobile stations to the first state;
  prompting for a user input in response to the request to set the status indicator corresponding to the selected mobile station to the first state;
  receiving the user input in response to prompting for the user input;

comparing the user input with the stored user password;
if the user input is the same as the stored user password, setting the status indicator corresponding to the selected mobile station to the first state; and
if the user input is not the same as the stored user password, denying the request to set the status indicator corresponding to the selected mobile station to the first state.

11. The method of claim 10 further comprising the step of setting the status indicator corresponding to at least one mobile station that is not the selected mobile station to the second state if the user input is the same as the stored user password.

12. The method of claim 11 wherein the step of setting the status indicator corresponding to the at least one mobile station that is not the selected mobile station to the second state comprises the step of storing a second value indicative of the second state in the status indicator corresponding to the at least one mobile station that is not the selected mobile station.

13. The method of claim 11 wherein the step of setting the status indicator corresponding to the at least one mobile station that is not the selected mobile station to the second state comprises the step of setting the status indicators corresponding to all of the remaining mobile stations except the selected mobile station to the second state.

14. The method of claim 10 further comprising the step of:
storing a plurality of unique electronic serial numbers (ESN) each corresponding to one of the plurality of mobile stations in the subscriber profile record.

15. The method of claim 10 wherein the step of setting the status indicator corresponding to the selected mobile station to the first state comprises the step of storing a first value indicative of the first state in the status indicator corresponding to the selected mobile station.

16. The method of claim 10 further comprising the steps of:
receiving a request to set the status indicator corresponding to a second selected one of the plurality of mobile stations to the second state; and
setting the status indicator corresponding to the second selected mobile station to the second state.

17. The method of claim 10 further comprising the steps of:
receiving a registration request message from a requesting mobile station, the registration request message comprising the common MIN and an electronic serial number (ESN) unique to the requesting mobile station to identify the requesting mobile station to the wireless network;
checking the status indicator corresponding to the requesting mobile station;
if the status indicator corresponding to the requesting mobile station is set to the first state, sending a response message in response to the registration request message indicating a successful registration and registering the requesting mobile station; and
if the status indicator corresponding to the requesting mobile station is set to the second state, sending a response message in response to the registration request message indicating an unsuccessful registration.

18. The method of claim 17 further comprising the step of:
storing a registered mobile station record in the subscriber profile record identifying the selected mobile station as the mobile station having its corresponding status indicator set to the first state.

19. The method of claim 18 wherein the step of checking the status indicator corresponding to the requesting mobile station comprises the step of checking the registered mobile station record in the subscriber profile record.

20. A system comprising:
a subscriber profile database to store a user subscriber profile;
a plurality of unique mobile station identifiers stored in the user subscriber profile, each unique mobile station identifier identifying a corresponding one of a plurality of mobile stations on a wireless network;
a common mobile identification number (MIN) to identify the plurality of mobile stations, the common MIN stored in the user subscriber profile;
a status indicator corresponding to each mobile station identified by the plurality of mobile station identifiers;
a registered mobile station record operable to identify a selected one of the plurality of mobile stations having its corresponding status indicator set to a first state; and
a call control system operable to set each of the status indicators corresponding to each of the plurality of mobile stations to the first state or to a second state in response to requests, wherein the selected mobile station having its corresponding status indicator set to the first state is allowed to register for service on the wireless network and mobile stations having their corresponding status indicators set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network.

21. The system of claim 20 further comprising:
a data network interface to a service provider server operable to receive requests from the service provider server to set at least one status indicator.

22. The system of claim 21 wherein the data network interface is a web-page interface.

23. A server comprising:
a subscriber profile database to store a user subscriber profile;
a plurality of unique mobile station identifiers stored in the user subscriber profile, each unique mobile station identifier identifying a corresponding one of a plurality of mobile stations on a wireless network;
a common mobile identification number (MIN) to identify the plurality of mobile stations, the common MIN stored in the user subscriber profile;
a status indicator corresponding to each mobile station identified by the plurality of mobile station identifiers, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network; and a signaling system interface operable to receive request messages to activate a selected one of the plurality of mobile stations, the server operable to set the status indicator corresponding to the selected one of the plurality of mobile stations to the first state in response to the request message to activate the selected one of the plurality of mobile stations.

24. The server of claim 23 wherein the signaling system interface is operable to receive request messages to deactivate a second selected one of the plurality of mobile stations, the server operable to set the status indicator corresponding to the second selected one of the plurality of mobile stations to the second state in response to the request message to deactivate the second selected one of the plurality of mobile stations.

25. A server comprising:
- a subscriber profile database to store a user subscriber profile;
- a plurality of unique mobile station identifiers stored in the user subscriber profile, each unique mobile station identifier identifying a corresponding one of a plurality of mobile stations on a wireless network;
- a common mobile identification number (MIN) to identify the plurality of mobile stations, the common MIN stored in the user subscriber profile;
- a status indicator corresponding to each mobile station identified by the plurality of mobile station identifiers, each status indicator having a first state and a second state, wherein mobile stations having their corresponding status indicator set to the first state are allowed to register for service on the wireless network, and mobile stations having their corresponding status indicator set to the second state are not allowed to register for service on the wireless network, wherein registering for service is a process conducted between a given mobile station and the wireless network, and wherein, by registering, the given mobile station transitions from being unable to place or receive calls via the wireless network to thereafter being able to place and receive calls via the wireless network; and
- a signaling system interface operable to receive request messages to activate a selected one of the plurality of mobile stations, the server operable to set the status indicator corresponding to the selected one of the plurality of mobile stations to the first state in response to the request message to activate the selected one of the plurality of mobile stations, wherein the signaling system interface is operable to set the status indicator corresponding to all of the plurality of mobile stations except the selected one of the plurality of mobile stations to the second state.

* * * * *